United States Patent [19]
Couper

[11] 3,755,732
[45] Aug. 28, 1973

[54] METHOD AND MEANS FOR TESTING HIGH FREQUENCY EQUIPMENT

[75] Inventor: William Dean Couper, Palmyra, Pa.

[73] Assignee: AMP Incorporated, Harrisburg, Pa.

[22] Filed: Jan. 13, 1972

[21] Appl. No.: 217,646

Related U.S. Application Data

[63] Continuation of Ser. No. 573,552, Aug. 19, 1966, abandoned, and a continuation of Ser. No. 857,601, Sept. 12, 1969, abandoned.

[52] U.S. Cl.......................... 324/58, 324/95, 333/10, 333/95 R
[51] Int. Cl............................................. G01r 27/04
[58] Field of Search...................... 324/58.5, 58, 95; 333/10, 95 R

[56] References Cited
UNITED STATES PATENTS

| | | | |
|---|---|---|---|
| 2,442,606 | 6/1948 | Korman | 324/58 X |
| 2,760,156 | 8/1956 | Fletcher | 324/58 |
| 2,762,972 | 9/1956 | Henning | 324/58 |
| 3,031,615 | 4/1962 | Chase et al. | 324/58 |
| 3,162,807 | 12/1964 | Alford | 324/58 |
| 3,233,172 | 2/1966 | Luoma | 324/58 |
| 3,238,451 | 3/1966 | Shively | 324/58 |
| 3,355,663 | 11/1967 | Aronoff | 324/58 |
| 3,403,335 | 9/1968 | Couper et al. | 324/58 B |

OTHER PUBLICATIONS

De Ronde, X-Band Reflectometer, In IEEE Trans. On Microwave Theory and Techniques, Vol. 13, pp. 435–440, July 1965, TK 7800I23

Engen, Amplitude Stabilization of a Microwave Source, In Tre Trans On Microwave Theory & Techniques, Vol. 6, pp. 202–206, April 1958, TK7800I23

Improvements In Microwave Swept Frequency Techniques, Hewlett Packard Application Note 54, Nov. 15, 1961, pp. 1–6, 324/58

New Coaxial Couplers for Reflectometer, Hewlett-Packard Journal, Vol. 16, No. 6, pp. 1–5, Feb. 1965, 324/58.5

Sorger et al., Swept Frequency High Resolution VSWR Measuring System, Weinschel Engr. Co. Report 90–117, 723–3/66, March 1966, 324/58

Primary Examiner—Stanley T. Krawczewicz
Attorney—William J. Keating et al.

[57] ABSTRACT

A system and method of measuring the reflection coefficient and VSWR of discontinuities on a high frequency transmission line comprises a sweep frequency generator connected to one end of the transmission, a pair of properly spaced detectors betweeen the generator and discontinuity, the detector closest to the generator feeding back a signal thereto to maintain the output amplitude constant, the transmission line between the discontinuity and generator being free to transmit all direct and reflexted waves. A measuring or recording device is coupled to the other detector for determining the reflection coefficient or VSWR.

6 Claims, 14 Drawing Figures

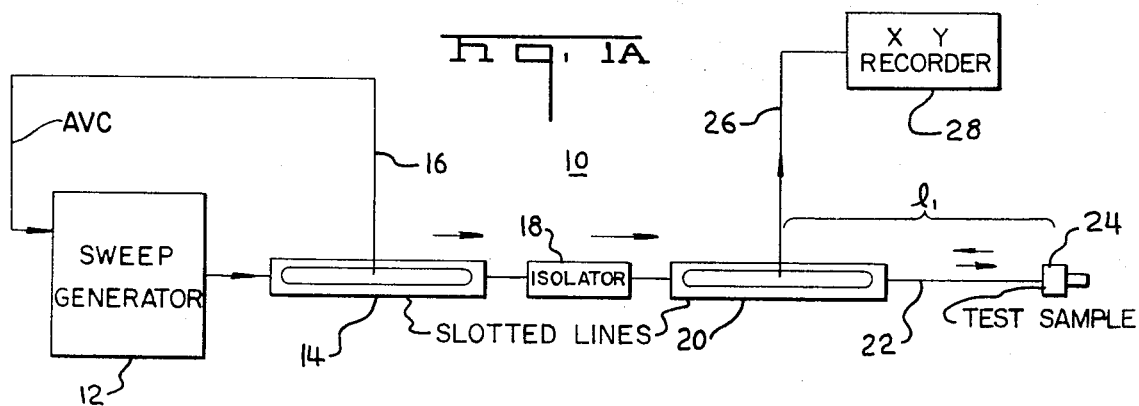
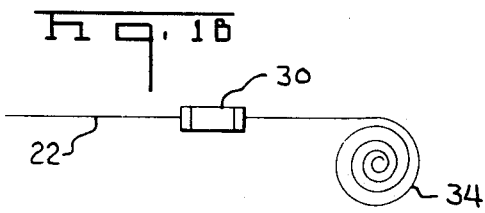
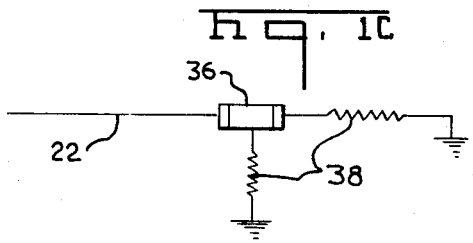
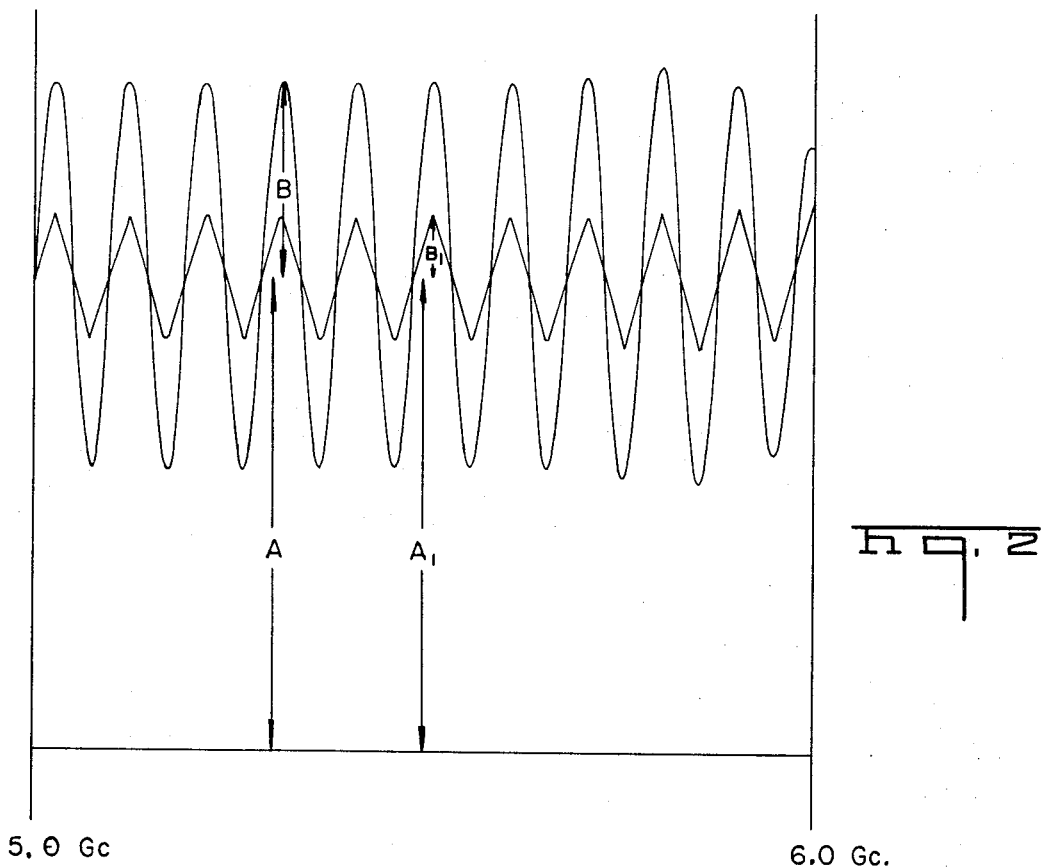

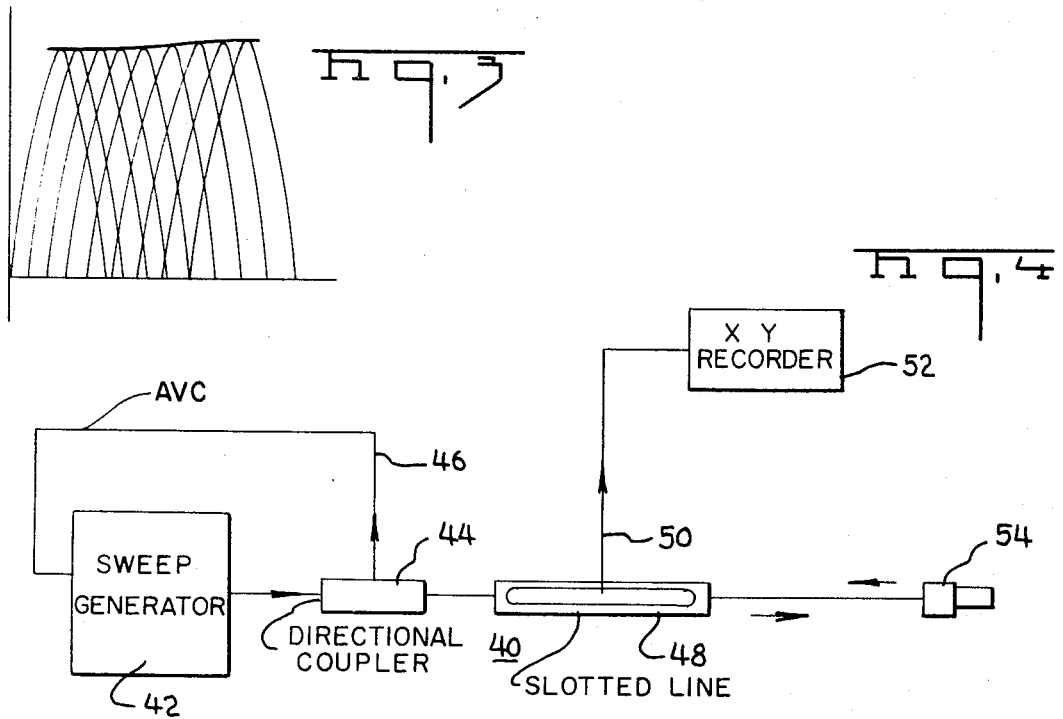
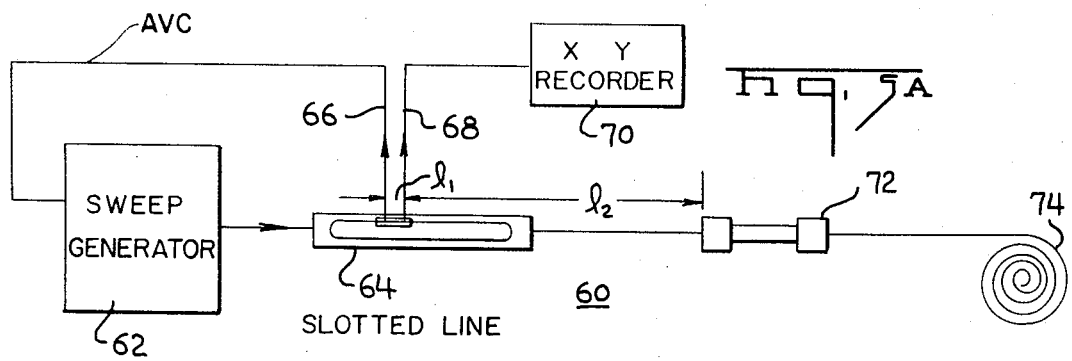
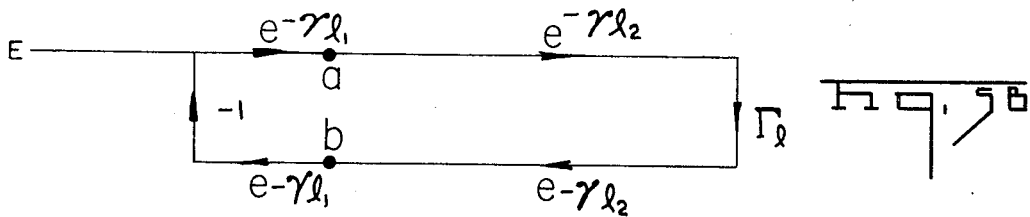

$\frac{C}{T_1 MC}$ TOTAL

PATENTED AUG 28 1973
3,755,732
SHEET 4 OF 4

METHOD AND MEANS FOR TESTING HIGH FREQUENCY EQUIPMENT

This application is a continuation of my prior copending application Ser. No. 573,552, filed Aug. 19, 1966, and now abandoned, and Ser. No. 857,601 filed Sept. 12, 1969, now abandoned.

This invention relates to a means and method for testing and measuring the signal handling characteristics of high frequency distribution apparatus. The invention is particularly useful in measuring the reflection coefficient and VSWR of connectors, splices, terminals, adaptors and other similar devices employed in high frequency distribution networks as well as testing out such networks and systems containing such devices.

The communications industry has witnessed a constant increase in the frequency of signals which must be transmitted, received and distributed by communication equipment. This increase in signaling frequency has sponsored a necessary upgrading of the transmission lines required for handling the signals and of the various devices which are employed in such lines such as connectors, couplers, adaptors, loads and the like. The figure of merit most frequently relied upon to ascertain the quality of lines and devices is reflection coefficient or VSWR. The reflection coefficient of a transmission line is the ratio of reflected wave to incident wave at a given point in a transmission line for a given mode of transmission. Most frequently this is expressed as the voltage or electric field strength of the two waves. Sometimes this is called a mismatch factor or a transition factor since it is related to the effect of a discontinuity in the transmission line. In design efforts reflection coefficient or VSWR values are examined over a range of frequencies of the particular application of use and improvements in transmission lines or in associated apparatus are made by attempting to eliminate discontinuities which increase the reflection loss or the VSWR of the line or device. In a manner of speaking then, design improvements and proper designs are dependent upon the ability to measure reflection coefficient and VSWR in a line or in a device.

A number of techniques have been developed for such measurements including one which is based upon interference patterns developed within a transmission line as a composite signal of a given electric field strength or voltage made up of transmitted and reflected signal components. One of these techniques calls for the injection of a signal of increasing frequency over a given frequency range coupled with recordation of the interference pattern resulting therefrom taken out of the line of test by a detector capable of developing the composite voltage. In an article entitled Improved Reflectometer Tests for Coaxial Connectors by Frank Jayne in Microwaves, September 1962, pages 34–38 and 55, there is described a swept frequency technique which provides reflection coefficient measurements which are more accurate than that of a conventional reflectometer and which takes no longer to perform than other techniques take.

One of the problems with the known prior art techniques is that the test equipment utilized to make measurements itself creates reflections from discontinuities present in even the better connectors employed to link up the test equipment. Typically and in the Jayne test set-up the actual voltage sampled is made to pass through a mismatch which although of optimum design still generates reflections. These reflections are present in the very frequency range in which a tested device may cause reflections.

It is an object of the present invention to provide a method and means which substantially reduces the number of discontinuities which must be employed in a circuit for measuring reflection coefficient or VSWR. It is a further object to provide a method of measurement which enables a determination of reflection coefficient or VSWR in a manner which is more accurate than heretofore available and in a manner which permits a better use of available measuring instruments and reflection standards.

It is yet another object of the invention to provide a measuring technique which gives a more complete picture of the discontinuities present in a transmission line, transmission system or in the devices utilized to connect such system or line.

It is still another object of the invention to provide a device which may be quickly and easily installed on a test line or on an existing transmission system and which in construction is simple and inexpensive as compared with prior art devices.

The foregoing objectives are obtained in the present invention in one embodiment by eliminating the need for more than two connectors used in a test line relative to reflection coefficient or VSWR measurements made or to be made on a test sample. This is accomplished by using a standard section or transmission line having the test sample attached to one end and a sweep frequency generator attached to the other end. The generator is made to supply a varying frequency signal in such line to the test sample and a pair of detectors are provided in the line which are of a construction to minimize the effects thereof on the line. One of the detectors is utilized to supply a feedback signal to the sweep generator to hold the average value of the interference pattern resulting in the line constant. The other detector is utilized to develop a composite signal made up of the reflected signals, a number of rereflected signals and the injected signal, the composite signal being made to drive a standard X-Y recorder to reproduce the composite interference pattern existing in the line at the location of the second detector. It has been found that this composite signal gives an accurate measurement of reflection coefficient and the VSWR. In one variation of the invention circuit one or more slotted lines is utilized to house the detectors and to thereby match the feedback signal to the sample signal. This also permits a controlled change in the length of the line between the site of the detector and the test sample thus developing a displacement of the recorded composite signal to trace an envelope and to provide a readily observable measure of interference phenomena. In one embodiment the invention contemplates the use of isolation between the pair of detectors and in another embodiment the invention contemplates no isolation with the measurement being made of still a different composite interference pattern. The invention circuit also contemplates a use in locating serious discontinuities in an existing transmission line distribution system over a range of frequencies to thus improve upon the function of a time domain reflectometer. As a preferred embodiment of test or measurement hardware the invention contemplates embodiments which may be readily and easily inserted in or clamped on an existing line to provide sweep generator leveling signals and the detected test voltage for the interference wave form representation of test sample equality.

In the drawings:

FIG. 1A is a schematic diagram of the invention circuit in one embodiment set up to provide a measurement of reflection coefficient through a measurement of interference pattern relative to an adaptor device for use in a coaxial transmission system;

FIG. 1B shows an arrangement for providing test measurements on a connector;

FIG. 1C shows the test set-up for testing a directional coupler;

FIG. 2 shows a typical interference pattern over a frequency range resulting from the use of the circuit of the invention;

FIG. 3 shows the effect of axial displacement of the test detector to develop an envelope of the test pattern;

FIG. 4 shows an alternative circuit embodiment for providing an interference pattern made up of a composite signal like that of FIG. 2;

FIG. 5A shows an alternative circuit embodiment of the invention for developing an interference pattern made up of a different type of a composite signal;

FIG. 5B shows an equivalent circuit flow graph for that of FIG. 5A used to explain and analyze the operation of the circuit;

Figure 6:
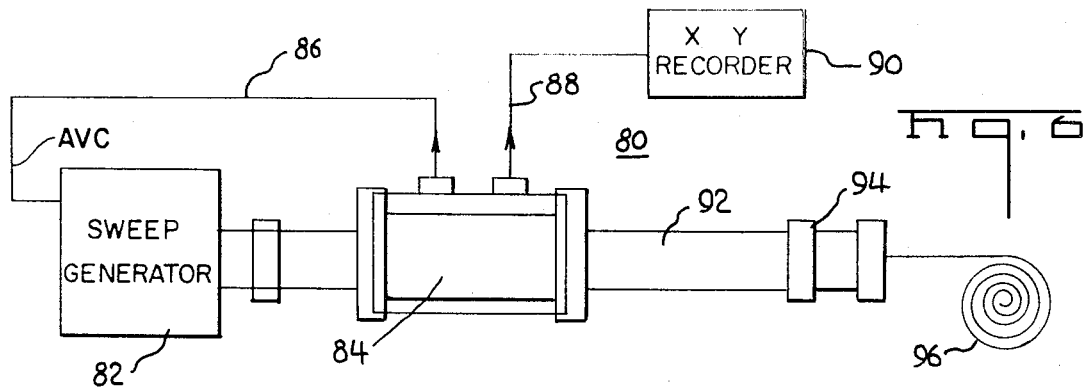
FIG. 6 shows yet another circuit embodiment for making interference pattern measurements.

Referring now to FIG. 1A one embodiment of the circuit according to the invention is shown as 10. This circuit is comprised of a sweep frequency generator 12 having its output connected as shown to a series of elements which lead to a test sample attached to the end thereof and labeled 24. The generator 12 is of a type which is capable of producing distinct signal frequency sweeps over the range wherein signal frequency response of the test sample is to be examined. Units frequently used for this purpose are the Hewlett-Packard Sweep Oscillator Series 691-B, 692-B, 693-B and 694 which provide four bands of frequency sweep over the range of from 1.0 Gc to 12.4 Gc. In a given sweep the unit will provide an output signal which starts at a given frequency as at 5.0 Gc and sweep to another point as at 6.0 Gc and then repeat.

In the circuit 10 the output from generator 12 is fed to a first slotted line 14 which may be of a standard construction to have an input and output and a facility for moving a signal sampling detector along its length. The output of the detector of the unit 14 is connected by a lead 16 back to the automatic level control input of the sweep generator. In operation this feedback holds the average value of the output of 12 constant.

This permits a number of advantages which will be made apparent hereinafter. The output from the slotted line 14 is connected to an isolation unit 18 which is adapted to pass signal energy down the line towards the test sample and to block reflections therefrom back into 14. This isolation unit may be any one of a number of standard units well known in the art. In an actual circuit the isolation unit 18 was a commercially available E & M Laboratories Model No. L20PT. The slotted lines were General Radio 900LB units. In the circuit at the output of 18 is connected a second slotted line 20 which is preferably identical in construction to that of 14. The detector output from slotted line 20 is connected by a lead 26 to an X-Y recorder. The recorder is shown as 28 and it may be any one of a number of commercially available units. In an actual circuit the recorder used was the model Moseley 7000A. The detector output signal voltage from unit 20 is supplied by a coaxial line which drives the recording needle of the recorder in X and Y directions. The output of unit 20 is connected by a section of coaxial line 22 to the device to be examined, an adaptor test sample 24. The length of 22 plus the distance from the detector of 20 shown as $l$ is made to be long enough to get good definition of the envelope of the interference pattern by a suitably short period of the waveform. In an actual case $l$ was made to be five wave lengths in terms of the lowest frequency examined. In some cases where the test sample has a rapidly changing reflection coefficient with respect to frequency change it is advisable to use a length $l$ which is ten or even 15 wavelengths of the lowest test frequency. For the circuit embodiment of FIG. 1 the slotted line permits an examination with excellent definition of the envelope of the composite waveform with a minimum length $l$ and is for this reason preferred in certain cases.

FIG. 1B shows the coaxial line 22 connected to a connector test sample 30 which has its output connected to a long line 34. FIG. 1C shows the coaxial line section 22 connected to a directional coupler 36 which is being tested. The outputs of the coupler are grounded through matching loads shown as 38.

The signal energy developed by generator 12 is thus injected into the coaxial line and supplied to the test sample and the discontinuities therein cause a reflection signal which passes back through 22, through 20 to be blocked at 18 from 14 and 12. This creates a composite interference pattern made up of the injected signal and the reflected signal which traverse 20 and are detected and supplied via 26 to 28 driving the recorder to reproduce the composite wave pattern.

FIG. 2 shows an interference pattern over the swept range of frequencies from 5.0 Gc to 6.0 Gc. The waveform having the larger excursions represents the composite interference pattern caused by a standard applied to the end of coaxial line 22 in lieu of the test sample. Such standard loads are readily available and in an actual test a General Radio Series 900WR 120 load was applied to provide the reference waveform shown in FIG. 2. With the test sample attached to the coaxial line 22 replacing the standard and the same frequency range injected the recorder 28 is made to traverse the same sweep producing the test sample interference pattern which is shown as the smaller amplitude waveform in FIG. 2.

In accordance with the invention technique the standard pattern and the test pattern are made to have equal average voltage values indicated by the line through the center of the waveforms. The average voltage value for the standard and the test sample are denominated A and $A_1$, and $A_1$ is made to equal A. The voltage amplitudes of one-half of a cycle of the pattern for the standard and the test sample are denominated B and $B_1$. The relationship for detected voltages A, $A_1$, B, $B_1$, may be expressed as a detected voltage $V_D$ considering the square law of the crystal of the detector in the following manner:

$$V_D = \frac{(A+B)^2 - \overline{(A-B)^2}}{(A_1+B_1)^2 - (A_1-B_1)^2} = \frac{(A+B)^2 - (A-B)^2}{(A+B_1)^2 - (A-B)^2}$$

$$= \frac{2AB + 2AB}{2AB_1 + 2AB_1} = \frac{4AB}{4AB_1} = \frac{B}{B_1},$$

Now B is a quantity which is proportional to the reflection coefficient of the standard and $B_1$ is a similar quantity for the test sample. The reflection coefficient for the standard is known and therefore $B_1$ can be determined. For example if the measured peak-to-peak amplitude (2 B) of the standard waveform is 6.20 inches and that of the test sample is 3.10 inches then 2 B = 6.20 inches and $2 B_1$ = 3.10 inches and $2B/2B_1$ = 2.00 and $\Gamma B/\Gamma B_1$ = 2.00. If $\Gamma B$ is 0.20 then $\Gamma 1$ = 0.10. VSWR, $\rho_1$ is related to $\Gamma$ as follows:

$$\rho_1 = \frac{1+\Gamma_1}{1-\Gamma_1}$$

$$\rho_1 = \frac{1+.1}{1-.1}$$

$$\rho_1 = 1.222$$

As a point of advantage relative to the foregoing approach the recorded waveforms may be directly compared. This is possible because the feedback signal holds the average values constant or relatively so fairly well over a given sweep and because the comparison in the standard is direct and less dependent upon the square law of the crystal detector because deviations from the square law tend to cancel out due to the use of the ratio of the standard and the unknown or test sample.

In the foregoing manner reflection coefficient values $\Gamma$ and VSWR values $\rho$ may be readily measured on a test sample as compared with a standard. By moving the position of the detector in unit 20 along the slotted line the recorder may be driven to produce a repetitive pattern of traces of the standing wave in the circuit and thus provide an envelope as is indicated in FIG. 3. This greatly facilitates examination of the interference pattern at various points over the frequency range under investigation. As those skilled in the art will appreciate, discontinuities frequently occur at certain frequencies and the ability to examine $\Gamma$ and $\rho$ at specific points by frequency and detector movement scanning is of considerable advantage. Note that the test circuit contains only two connectors traversed by the test signal. It is, of course, contemplated that different standards may be used with waveforms recorded as indicated.

Turning now to FIG. 4 an alternative embodiment of a circuit of the invention is shown as a circuit 40. The sweep generator is of the type heretofore described and is shown as 42. The output of 42 is fed into a directional coupler 44 having an output over a coaxial lead shown as 46 back to the automatic level control of the sweep generator. This output effectively samples the generator output and feeds back a slowly varying DC level which holds the average value of generated and injected signal energy constant. The directional coupler 44 has an output to a slotted line 48 having a detector 50 mounted thereon adapted to drive an X-Y recorder shown at 52. The output of 48 is fed into a length of line having connected at the end thereof a test sample adapter 54. It is to be understood that tests of connectors and directional couplers may also be implemented by this circuit as shown in FIGS. 1B and 1C. The circuit of FIG. 4 as can be discerned is somewhat simpler in terms of required components than that of FIG. 1A. The level control provided is not as good as that of FIG. 1A but is quite adequate for many applications wherein the sample under test is of lower quality. The directional coupler 44 blocks the return of reflected energy to the generator or into the automatic level control lead 46. With the circuit of FIG. 4 the slotted line detector may be moved to provide the scan heretofore discussed and the test technique is substantially identical in terms of analyzing the interference pattern produced. This interference pattern is made up of the injected signal and the reflected signal as a composite signal. Note that as in the previous case the composite signal need pass only two connectors.

FIG. 5A shows an alternative embodiment as a circuit 60 which includes a sweep generator 62 having an output to a slotted line 64 carrying two detector output leads thereon 66 and 68. One of the detectors 66 is utilized for feedback to the automatic level control of the sweep generator and the other is used as the supply to the X-Y recorder shown as 70. At the output end of the slotted line 64 there is a length of line which leads to the test sample shown as 72. The test sample is a connector and the output of such sample is connected to a long line or load shown as 74. In the circuit of FIG. 5A there is a further reduction in the number of components employed and there is as will be discerned no isolation or directional coupling of the injected signal from the sweep generator. This means that the injected signal is caused to travel through the slotted line down through the section of line through the connector to be substantially absorbed in the long line or matched load with all reflections from the test sample traversing the slotted line back to the sweep generator to be re-reflected back down the line. The signal fed to the recorder then is a composite signal made up of the injected signal, and an infinite series of decreasing amplitude re-reflections between the test connector or test device and the probe which is connected to the automatic leveling control on the sweep generator. The recorder will produce this composite signal and it has been found that in most cases the signal may be analyzed in the manner heretofore described to produce a direct reading and comparison of reflection coefficient and VSWR. The previous analysis is, however, not adequate to explain the operation of the circuit and in fact, the circuit of FIG. 5A as well as the circuits of FIGS. 6 and 7 work on a different basis. Turning now to FIG. 5B there is a flow graph which represents circuit operation. Relative to FIG. 5B, the $-1$ quantity represents an effective zero impedance generator. The qualities $l_1$ and $l_2$ are the distances shown in FIG. 5. It is assumed that the probe of 68 causes no reflection itself and that there is no attenuation in the line (for analysis only).

If the voltage at 68 is $a + b$, then $$\frac{a+b}{E} = \frac{e^{-\gamma l_1} + \Gamma_l^{-\gamma l_1} e^{-2\gamma l_2}}{1 + \Gamma_l^{-2\gamma l_1} e^{-2\gamma l_2}}$$

but $$e^{-\gamma l_1} = e^{-jBl_1} = \cos \frac{2\pi l_1}{\lambda} - j \sin \frac{2\pi l_1}{\lambda}$$

$$\text{Lot } \phi_1 = \frac{2\pi l_1}{\lambda}$$

$$\phi_2 = \frac{2\pi l_2}{\lambda}$$

$$\frac{a+b}{E} = \frac{[\cos \phi_1 - j \sin \phi_1] + \Gamma_l [\cos (\phi_1 + 2\phi_2) - j \sin (\phi_1 + \phi_2)]}{1 + \Gamma_l [\cos (2\phi_1 + 2\phi_2) - j \sin (2\phi_1 + 2\phi_2)]}$$

$$\frac{a+b}{E} = \frac{[\cos \phi_1 + \Gamma_l \cos (\phi_1 + 2\phi_2) - j [\sin \phi_1 + \Gamma_l \sin (\phi_1 + 2\phi_2)]}{1 + \Gamma_l \cos (2\phi_1 + 2\phi_2) - j\Gamma_l \sin (2\phi_1 + 2\phi_2)}$$

Let
$\cos \phi_1 + \Gamma l \cos (\phi_1 + 2\phi_2) = A$
$\sin \phi_1 + \Gamma l \sin (\phi_1 + 2\phi_2) = B$
$1 + \Gamma l \cos (2\phi_1 + 2\phi_2) = C$
$\Gamma l \sin (2\phi_1 + 2\phi_2) = D$ $$\frac{a+b}{E} = \frac{A - jB}{C - jD}$$

$$\left|\frac{a+b}{E}\right| = \sqrt{\frac{A^2 + B^2}{C^2 + D^2}}$$

but because of the detector square law, the voltage output of the detector ($V_D$) is $(a+b)/E^2$ $$V_D = \left(\frac{a+b}{E}\right)^2 = \frac{A^2 + B^2}{C^2 + D^2}$$

$$V_D = \frac{\cos^2 \phi_1 + 2\Gamma_l \cos \phi_1 \cos (\phi_1 + 2\phi_2) + \Gamma_l^2 \cos^2 (\phi_1 + 2\phi_2) + \sin^2 \phi_1 + 2\Gamma_l \sin \phi_1 \sin (\phi_1 + 2\phi_2) + \Gamma_l^2 \sin^2 (\phi_1 + 2\phi_2)}{1 + 2\Gamma_l \cos (2\phi_1 + 2\phi_2) + \Gamma_l^2 \cos^2 (2\phi_1 + 2\phi_2) + \Gamma_l^2 \sin^2 (2\phi_1 + 2\phi_2)}$$

$$V_D = \frac{1 + \Gamma_l^2 + 2\Gamma_l \cos \phi_1 \cos (\phi_1 + 2\phi_2) + 2\Gamma_l \sin \phi_1 \sin (\phi_1 + 2\phi_2)}{1 + \Gamma_l^2 + 2\Gamma_l \cos (2\phi_1 + 2\phi_2)}$$

$$V_D = \frac{1 + \Gamma_l^2 + 2\Gamma_l \cos 2\phi_2}{1 + \Gamma_l^2 + 2\Gamma_l \cos (2\phi_1 + 2\phi_2)}$$

$$V_D = \frac{1 + \Gamma_l^2 + 2\Gamma_l(1 - 2\sin^2 \phi_2)}{1 + \Gamma_l^2 + 2\Gamma_l[1 - 2\sin^2 (\phi_1 + \phi_2)]}$$

$$V_D = \frac{1 + 2\Gamma_l + \Gamma_l^2 - 4\Gamma_l \sin^2 \phi_2}{1 + 2\Gamma_l + \Gamma_l^2 - 4\Gamma_l \sin^2 (\phi_1 + \phi_2)}$$

$$V_D = \frac{(1 + \Gamma_l)^2 - 4\Gamma_l \sin^2 \phi_2}{(1 + \Gamma_l)^2 - 4\Gamma_l \sin^2 (\phi_1 + \phi_2)}$$

$$V_D = \frac{(1 + \Gamma_2)^2 - 4\Gamma_l \sin^2 2\pi l_2/\lambda}{(1 + \Gamma_l)^2 - 4\Gamma_l \sin^2 2\pi l/\lambda}$$

$$V_D = \frac{1 + \Gamma_l^2 + 2\Gamma_l \cos 4\pi l_2/\lambda}{1 + \Gamma_l^2 + 2\Gamma_l \cos 4\pi l/\lambda}$$

The voltage $V_D$ is the detected output voltage supplied to the recorder and as demonstrated is definitely related to the reflector coefficient of the test sample.

In the circuit of FIG. 5A it is contemplated that the detectors mounted on the slotted line 64 may be carried in a common carriage to be moved together or may be mounted in separate carriages to be moved separately. The usual practice would have them mounted separately with the detector associated with the output to the recorder being manipulated to provide the envelope heretofore described. Movement of the automatic level control detector has not been found to substantially affect functioning of the circuit.

FIG. 6 shows a further embodiment wherein the circuit 80 includes a sweep generator 82 having an output to a specialized section of coaxial line 84. The test line 84 is merely a length of coaxial transmission line having a connector half at each end adapted to mate to the sweep generator and to another section of line and having positioned thereon two fixed detectors, one supplying the automatic level control of the sweep generator shown as lead 86 and one supplying lead 88 to the X-Y recorder shown as 90. These detectors may be constructed as taught in my co-pending application, Ser. No. 456,915 filed May 19, 1965, now U.S. Pat. No.

first detector means coupled to the line at one point thereof, second detector means coupled to the line at a single 3,403,333 and applied directly to the line as shown relative to FIGS. 9 – 11 hereinafter. The output from 84 goes into a length of line 92 and then to the test sample which is shown as a connector 94 terminated to a long line or lead shown as 96. A preferred construction of the detector assembly is shown in my co-pending application previously mentioned.

It has been found that the circuit of FIG. 6 is extremely accurate, is easily installed and is a simple and inexpensive means of carrying out the method of the invention. It does not offer the flexibility of being able to transcribe an envelope of the interference pattern but when used with the sweep generator it does present a scan of the discontinuities created by 94 over a frequency range which may be effectively examined point by point from the resulting waveform transcribed by the recorder.

Figure 7:
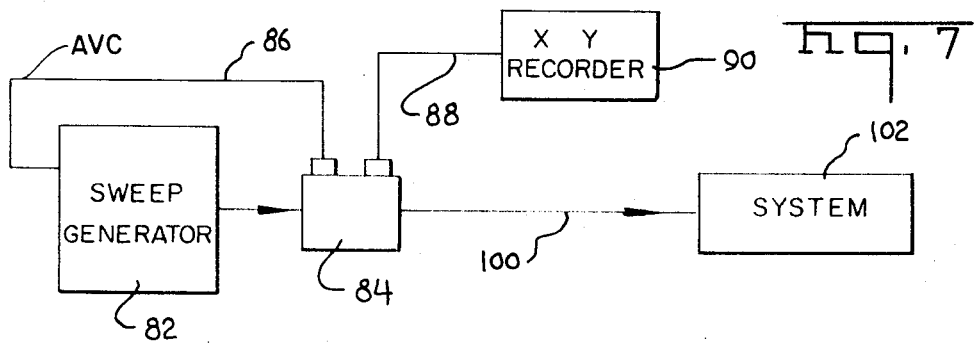
FIG. 7 shows the test set-up of FIG. 6 relative to its use in measuring the location of discontinuities in a system.
Figure 8:
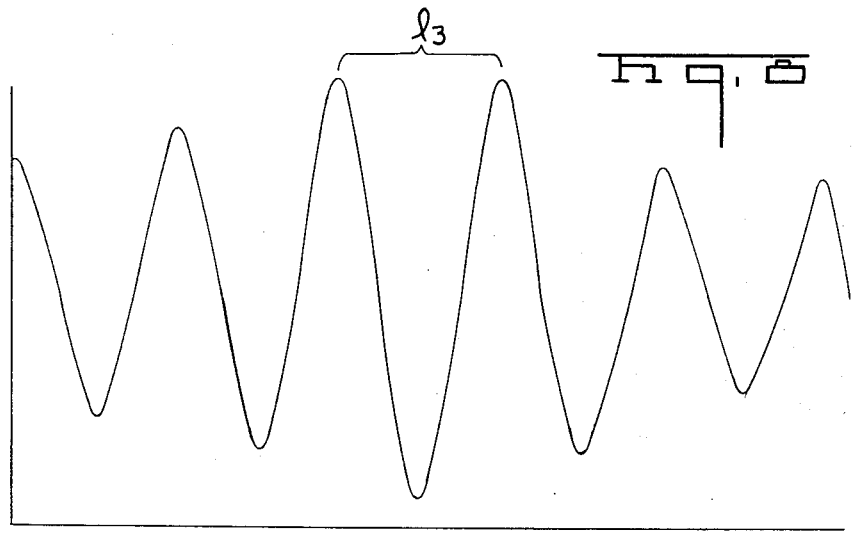
FIG. 8 shows an interference pattern waveform developed through the use of the circuit of FIG. 7.

FIG. 7 shows the circuit of FIG. 6 supplying a length of line 100 which leads to a block shown as 102 which represents a test system. The system 102 may be made up of a number of links and paths or networks of coaxial devices. This system will, when driven as heretofore taught, cause an interference pattern which may appear as is shown in FIG. 8. The occurrence of a waveform excursion which indicates a discontinuity as is shown by the waveform in FIG. 8 gives a measure of the location of the discontinuity. A time domain reflectometer works in a similar fashion but without the capability of examining a system over a range of frequencies as is provided by FIG. 7. To measure the location of the discontinuity the distance $l_3$ between adjacent fault amplitudes is taken and converted to a distance. For example, assuming that the length $l_3$ is in terms of frequency 400 megacycles or $400 \times 10^{+6}$ cycles per second and assuming that the energy is taken to be transmitted at the speed of light or $3 \times 10^{+10}$ centimeters per second, a resulting ratio of the speed of light to the signal frequency will equal approximately 70 centimeters. This 70 centimeters represents the total distance out and back from the probe connected to lead 88 of the detector connected to the recorder to the discontinuity in the system. After the discontinuity has been located in a given frequency range, a further and more detailed analysis may be made by adjusting the sweep generator to increase the relative amplitude of the signal and reduce the total sweep of the frequency range. With the circuit of the invention the discontinuity may then be corrected. A further examination of the system may then be made to reveal the next order discontinuity which perhaps was masked by the first discontinuity or might very well have been created by correction of the first discontinuity if such is not ideal which is typically the case.

Figure 9:
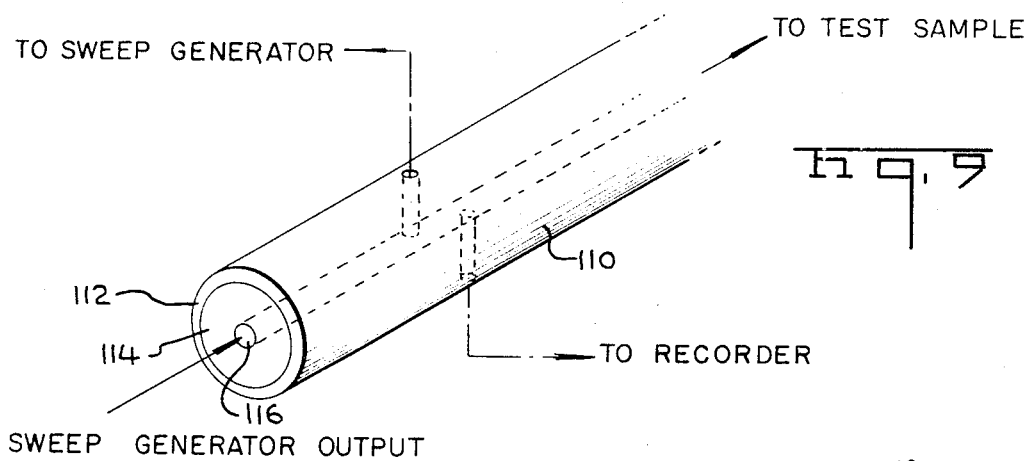
FIG. 9 shows a section of coaxial transmission line as prepared for use of one form of the invention device and method.
Figure 10:
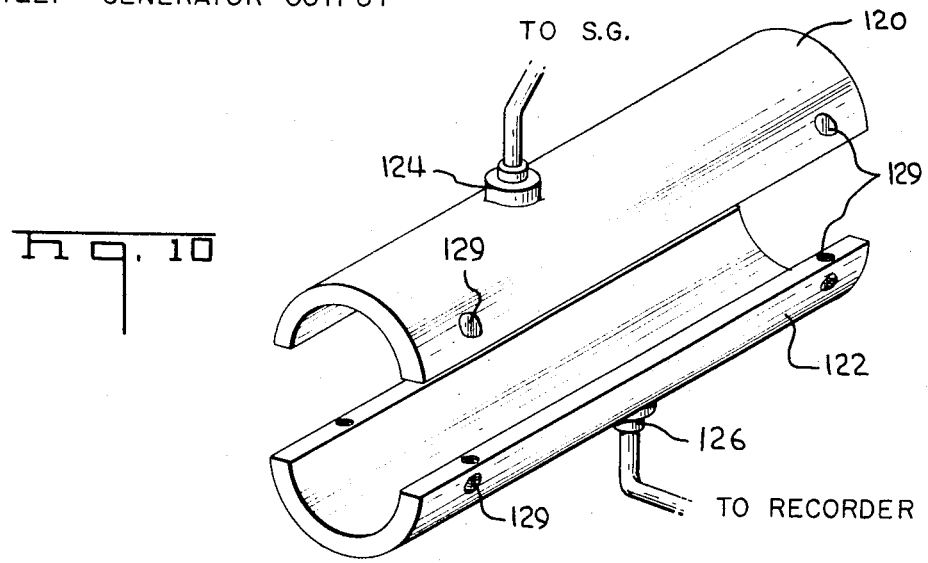
FIG. 10 shows an exemplary embodiment of a test apparatus which may be readily installed upon a section of transmission lines prepared as in FIG. 9.

Turning now to FIG. 9 there is shown a length of coaxial cable 110 which is of typical construction to include an outer metallic tubular conductor 112, a dielectric medium comprised of some dielectric material 114 such as foamed Teflon, polypropylene or perhaps a spiral bead dielectric material and a center conductor 116 which is typically copper, solid or hollow. Cable of this type is manufactured to close tolerances in terms of maintaining the characteristic impedance along the length thereof constant. In accordance with a further aspect of the invention the segment of line between the signal generator and the test sample is made of a length of coaxial cable like 110. It would, of course, have a connector on the end which is connected to the signal generator and would have a connector leading to the test sample at the other end. Somewhere along this line fairly close to the signal generator small holes are drilled through the outer conductor and the dielectric material if such is solid to the cable center conductor. These holes may be made on the order of 0.015 (of an inch) or perhaps less so as to minimize the effect thereof on the transmission line. The holes are preferably made on opposite sides of the line and spaced apart by a distance which is approximately ⅜ of a wavelength at the highest frequency of operation anticipated. With the cable so prepared a detector assembly such as that shown in FIG. 10 is then applied to the cable with the detector probes being inserted in the holes at each of the detector positions. The assembly in FIG. 10 is shown to be comprised of two halves 120 and 122 which have an interior configuration conforming approximately to the exterior surface configuration of the cable of use. In these halves are detector assemblies 124 and 126 which connect the leads to the automatic level control of the sweep generator and to the X-Y recorder used with the circuit of the invention. The halves of assemblies 120 and 122 are positioned onto the cable 110 and affixed thereto so that the probes from the assemblies 124 and 126 may then be driven into the holes, not far enough to touch the center conductor but sufficient to extract a very small sample signal of the signal energy and composite interference pattern existing in the cable during test. It is contemplated that the halves 120 and 122 containing the assemblies 124 and 126 may be carried in some housing which is readily clamped to the cable and which will serve to rigidly secure and position such to the cable and protect the connectors and probes when not in use. Alternatively the halves may be merely bolted together on the cable through the several fittings shown as 129.

Figure 11:
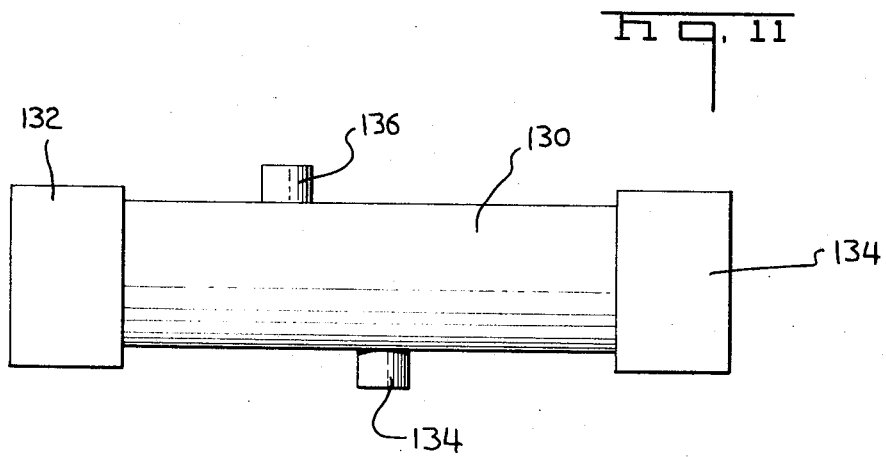
FIG. 11 is an alternative embodiment of an apparatus which may be utilized directly in the circuit of the invention to provide the desired interference pattern resulting from a test sample connected to the end thereof.

FIG. 11 shows still another embodiment which is comprised of a sleeve of coaxial line 130 having at one end a connector half 132 and at the other end a half 134. The half 132 is made to connect the sweep generator and the half 134 is made to connect a further section of coaxial line which leads to the test sample. Affixed to the sleeve 130 are detector assemblies 136 and 134 carrying probes. This embodiment may be used as heretofore described.

In each instance in the circuit heretofore described a recorder has been shown. It is contemplated that an oscilloscope may be used in lieu of the recorder and one having a long persistence feature is preferred.

While emphasis has been given to coaxial lines it is contemplated that the various means and techniques of the invention may be used with wave guides and devices using wave guide transmission modes.

Having described the invention in terms intended to enable preferred practice the invention is now defined by the appended claims.

What is claimed is:

1. In a system for measuring the reflection coefficient of VSWR or a high frequency component device, a circuit comprising a sweep generator provided with an automatic gain control for providing a signal comprised of a sweep of signal frequencies over a high frequency predetermined range of frequencies, a transmission line, means for injecting said signal into one end of said transmission line, said transmission line being connected at its other end to the device under test, point spaced from the first detector toward the device being tested, and separated from said device by a plurality of wave lengths at the lowest frequency within the range, said transmission line between the sweep frequency generator and the device being free to transmit incident and all reflected energy, whereby the first and second detecting means sense both the incident and reflected energy on the line at their point of coupling thereto, means for applying the output of the first detecting means to the gain control of the sweep frequency generator to maintain the voltage on the line at the point of coupling of the first detecting means thereto at a substantially constant level, and means for measuring the output of the second detecting means to determine the reflection coefficient or VSWR of the device.

2. In a system as defined by claim 21 wherein the measuring means comprises means for exhibiting the variations in voltage relative to variations in frequency at the location of the second detecting means.

3. In a system as defined by claim 21 including means for supporting the first and second detecting means in fixed relation to each other.

4. In a system as defined by claim 23 wherein the supporting means is mounted for movement along the line.

5. In a system as defined by claim 21 in which the second detecting means is mounted for movement along the line relative to the first detecting means.

6. In a system as defined by claim 21 wherein the high frequency component device is terminated in its characteristic impedance.

* * * * *

(5/69)

CERTIFICATE OF CORRECTION

Patent No. 3,755,732      Dated August 28, 1973

Inventor(s) WILLIAM DEAN COUPER

It is certified that error appears in the above-identified patent and that said Letters Patent are hereby corrected as shown below:

Column 10, lines 62 and 63, that portion of the formula reading of a sweep of signal frequencies over a high frequency predetermined range of frequencies, should read of a sweep of signal frequencies over a predetermined range of frequencies, Column 10, line 64, that portion of the formula reading a transmission line,    should read
    a high frequency transmission line, Column 11, line 1, that portion of the formula reading point spaced from the first detector toward the deshould read first detector means coupled to the line at one point thereof,
    second detector means coupled to the line at a single point spaced from the first detector toward the de- Signed and sealed this 27th day of November 1973.

(SEAL)
Attest:

EDWARD M. FLETCHER, JR.
Attesting Officer

RENE D. TEGTMEYER
Acting Commissioner of Patents